3,287,171
PLATINUM-RHENIUM ANODIC OXIDATION CATALYST
Eugene L. Holt, Forest Hills, N.Y., assignor to Esso Research and Engineering Company, a corporation of Delaware
No Drawing. Filed Mar. 27, 1963, Ser. No. 268,439
4 Claims. (Cl. 136—120)

This invention relates to an electrochemical oxidation catalyst and to electrodes for use in electrochemical cells. In particular, this invention relates to catalysts comprising a mixture of a platinum and rhenium catalyst prepared by chemical coreduction from a solution containing platinum and rhenium salts and electrodes comprising a metallic electroconductive base having such produced platinum-rhenium catalyst thereon. More particularly, this invention relates to fuel cells or electrolytic cells employing a coreduced platinum-rhenium catalyst on the electrodes. The function of the fuel electrode or anode in the anodic oxidation of a combustible fuel is essentially independent of the type of cathode employed. Therefore, an electrode suitable for effecting anodic oxidation may be employed in either a fuel cell or an electrochemical cell for anodic oxidation. Anodic oxidation occurs when the fuel comes into dual contact with the electroconductive surface of the anode and the electrolyte. The efficiency of such anodic oxidation may be increased if the fuel comes into contact with the electroconductive surface of the anode, the electrolyte and suitable catalyst. In cells employing an aqueous electrolyte and operated at low temperatures, i.e. temperatures below 600° F. and commonly between about 75 and 300° F., catalysts are employed to increase the rate of the reaction. Obviously, where the catalyst itself is a good conductor, it may be used as the electrode. However for many reasons, namely cost, structural requirements, etc. the electrodes are composed of a base of one material which is then coated with a catalytic material. The electrode base may ordinarily be of any suitable material such as electroconductive metal or carbon.

In the past various metals and simple oxides thereof have been tried as oxidation catalysts. Included among these metals are metals such as copper, silver, gold and transition metals of Group VIII of the Periodic Table. Some of the metals fail for want of chemical activity, others undergo chemical change to a form that is soluble and they react with the electrolyte or the substance being oxidized. Thus, for example, while nickel may resist chemical attack in a basic medium, it is totally unfit as a catalyst in a strong acidic medium where it has been found to be necessary to employ one of the so-called noble metals; e.g. platinum, gold, irridium, etc.

The effectiveness of an anodic catalyst is demonstrated by its ability to maintain potential with current flow in the half-cell; i.e. minimize loss of voltage with an increase in current density. The effectiveness is indicated by the polarization, the loss of voltage and the current density. The effective system has a high current density coupled with a low polarization.

It has now been discovered that a platinum-rhenium catalyst, which has been produced by chemical coreduction from a solution of platinum and rhenium salts, provides a highly effective catalytic material for accelerating the electrochemical oxidation of a combustible fluid fuel at the anode of an electrochemical cell. This catalytic activity can be maintained over long periods of sustained operation in cells employing either acidic or basic electrolytes. The catalyst of this invention is employed with a noncarbon electroconductive support. Such supports may comprise a metal, an organic membrane coated with electroconductive metal or a nonconductive material such as glass or ceramic which has been coated with an electroconductive metal. Carbon electrodes reduce the efficiency of the electrode to that of platinum alone.

When current is drawn from a cell, some polarization, represented by a voltage drop, always occurs at each electrode, thereby reducing the potential between the anode and the cathode of the cell or, in the case of an electrolytic reactor, the amount of current passing through. The platinum-rhenium catalyst of this invention gives a surprisingly low polarization. This polarization is more surprising in view of the high polarization obtained when using rhenium catalysts alone or a mixture of platinum and rhenium catalysts wherein the platinum and rhenium salts have been reduced separately and the resulting catalysts mechanically admixed. The platinum-rhenium catalyst mixture of this invention is inert to both basic and acidic electrolytes under the conditions of reaction employed in an electrolytic cell. Thus, the catalyst and electrodes of this invention may be employed with strong bases such as KOH, NaOH, LiOH; aqueous solutions of strong acids such as $H_2SO_4$, $H_3PO_4$, HCl or perchloric and with aqueous carbonate electrolytes such as $$K_2CO_3\text{-}KHCO_3$$

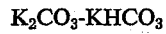

$Na_2CO_3$-$NaHCO_3$. Since the anodic half-cell reaction is essentially independent of the cathodic half-cell reaction, the anodes of this invention may be employed with any of the fuel cell or electrolytic cathodes known in the art.

In the preparation of the catalyst-bearing electrodes of this invention, the platinum-rhenium catalyst is formed either in situ or reduced separately and then impressed upon the electrode.

The process for preparing the catalyst of this invention consists of reducing a mixed solution of platinum and rhenium salts with a solution of a reducing agent. Reducing agents such as alkali metal borohydride, hydrazine, hypophosphorus acid, sulfur dioxide, metal alkyls and silanes may be used. Preferably sodium borohydride is employed as a reducing agent. The salt solution comprises a mixture of platinum and rhenium salts with a solvent.

Any of the known platinum and rhenium salts soluble in the solvent may be used. Salts such as sodium perrhenate, potassium perrhenate, rhenium trichloride, rhenium heptoxide, ammonium platino nitrate, dinitrito diammino platinum, barium platino cyanide, sodium chloroplatinate, ammonium chloroplatinate, sodium bromoplatinate, potassium iodoplatinate, potassium cyanoplatinate, platinum tetrachloride and platinum trichloride may be mentioned as examples of the known soluble salts that may be employed in the practice of the instant invention.

The reducing solution comprises a reducing agent and a solvent. The solvents may be water or an organic compound such as alcohols, ketones, glycols or ethers. The temperature of the solution may be any temperature up to the boiling point of the solution. Temperatures of from 0 to 90° C. are preferred and almost preferably temperatures from 15 to 75° C. Concentrations of the salts and NaBH$_4$ may be from 0.01 molar to saturation, preferably from 0.05 to 4.0 molar and most preferably from 0.10 to 2.0 molar. The relative mole percent of each salt in the salt solution is dependent upon the catalyst to be produced. The relative mole percent of rhenium may vary from 10 to 70, and most preferably from 25 to 50.

The catalysts of this invention are in the finely divided activated state which are particularly suitable as catalysts. They may be used for vapor phase reactions such as oxidation, dehydrogenation, dehydration, hydrogenation, cracking and isomerization. In addition, they are extremely useful as catalysts in electrochemical oxidation and reduction reactions without the need of prior activation steps such as required by the known processes of producing alloys and catalysts. Such art recognized activation steps include anodization, cathodization and heat sintering.

Electrodes which may be produced by this invention comprise metal supports such as a metal screen welded to a metal sheet, a metal coated membrane or metal coated nonconductive materials. The electrode of this invention may be prepared by pressing techniques disclosed in copending applications Ser. No. 250,515 and Ser. No. 250,798. The electrodes of this invention are prepared by coating a metal coated membrane with a slurry of the codeposited platinum-rhenium catalyst and thereafter subjecting such structure to mechanical pressure or the electrodes may be prepared by mechanically pressing the codeposited platinum-rhenium catalyst onto a base structure comprising a metal screen welded to a metal sheet. The catalysts of this invention are effective oxidation catalysts for the oxidation of fluid carbonaceous fuels. Such fuels include saturated hydrocarbons such as methane, ethane, dodecane; unsaturated hydrocarbons such as cyclohexene, acetylene, butene; and oxygenated hydrocarbons such as methanol, ethanol, glycol, formaldehyde, formic acid, etc.

It has been found that the instant codeposited platinum-rhenium catalyst is highly effective as an anodic oxidation catalyst when used with a metal-comprising electrode in the absence of an electroconductive carbon. When the catalyst of this invention is used upon a carbon electrode, the activity is that of platinum alone. It has also been found that when platinum and rhenium salts are reduced separately and physically mixed, the resulting catalyst exhibits about the same activity as platinum alone, even when such mechanically admixed platinum-rhenium catalyst has been pressed upon a metal clad membrane.

The following examples are presented for purposes of illustration only and the details therein should not be construed as limitations upon the true scope of the invention as set forth in the claims.

*Example 1*

A platinum-rhenium catalyst was prepared by adding to a solution of sodium borohydride in water an aqueous solution of equal amounts of 0.5 M $Na_2PtCl_6$ and 0.5 M $Re_2O_7$. The resulting precipitated platinum-rhenium catalyst was pressed into an electrode structure comprising a platinum gauze welded to a platinum sheet. The electrode was tested for activity with 1 molar methanol as a fuel and 30 wt. percent sulfuric acid as the anolyte. An anode comprising a platinum screen with platinum black thereon was also tested for activity using 1 molar methanol as a fuel and 30 wt. percent sulfuric acid as the anolyte. Anodes consisting of platinum with platinum black thereon are recognized in the art as effective anodes for use in acid electrolytes.

The following table compares the activity of the platinum-rhenium catalyst of this invention with the well known platinum black anode.

TABLE I

| Catalyst | Polarization from theoretical $CH_3OH$ at indicated ma./cm.$^2$ | | | | |
|---|---|---|---|---|---|
| | 0 | 1 | 10 | 50 | 100 |
| Pt-Pt black | | .47 | .52 | .55 | .58 |
| Pt-Re | .14 | .21 | .33 | .41 | .44 |

*Example 2*

The effectiveness of the Pt-Re catalyzed electrode of Example 1 was demonstrated by substituting various fuels into the cell. A platinum black catalyzed anode was employed in another similar cell to demonstrate the increased efficiency of the Pt-Re catalyst. Both demonstration cells employed a 3.7 M $H_2SO_4$ electrolyte and were operated at 60° C.

The following table compares the activity of the platinum-rhenium catalyst of this invention with the well known platinum black catalyst.

TABLE II

| Fuel | Catalyst | Polarization from theoretical $CH_3OH$ at indicated ma./cm.$^2$ | | |
|---|---|---|---|---|
| | | 10 | 50 | 100 |
| Methanol | Pt-Re | 0.33 | 0.41 | 0.44 |
| Do | Pt-Black | 0.52 | 0.55 | 0.58 |
| Formic acid | Pt-Re | 0.24 | 0.32 | 0.35 |
| Do | Pt-black | 0.42 | 0.49 | 0.54 |
| Glycol | Pt-Re | 0.36 | 0.45 | 0.48 |
| Do | Pt-black | 0.63 | 0.68 | 0.73 |
| Formaldehyde | Pt-Re | 0.19 | 0.25 | 0.29 |
| Do | Pt-black | 0.52 | 0.55 | 0.58 |

*Example 3*

The effectiveness of the coreduced Pt-Re catalyst of this invention was compared to Pt-Re catalysts prepared by reduction of the salts separately and the reduced products physically mixed and electrical deposition of the salts.

Three electrodes were prepared.

*Electrode A.*—To an aqueous solution of sodium borohydride was added a solution comprising equal volumes of 0.5 M $Na_2PtCl_6$ and 0.5 M $Re_2O_7$. The resulting precipitate was mechanically pressed onto a gold coated membrane.

*Electrode B.*—A 0.5 M solution of $Na_2PtCl_6$ was added to a sodium borohydride solution and a precipitate resulted. A 0.5 M solution of $Re_2O_7$ was added to a sodium borohydride solution and a precipitate resulted. The two precipitates were physically mixed and then mechanically pressed into a gold coated membrane.

*Electrode C.*—A gold coated membrane was immersed into a solution of equal volumes of 0.5 M $Na_2PtCl_6$ and 0.5 M $Re_2O_7$. An electric current was induced thereby causing the Pt and Re to deposit upon the gold coated membrane.

Electrodes A, B and C were used as the anodes in cells employing a 3.7 M $H_2SO_4$ electrolyte, 1 M methanol as the fuel and operated at 60° C.

The following table compares the activity of the three electrodes.

TABLE III

| Electrode | Polarization from theoretical methanol at indicated ma./cm.$^2$ | | |
|---|---|---|---|
| | 10 | 50 | 100 |
| A | 0.34 | 0.42 | 0.45 |
| B | 0.53 | 0.57 | 0.59 |
| C | 0.41 | 0.47 | 0.51 |

*Example 4*

The anolytes of each of the cells employing electrodes A, B and C were tested to determine the amount of Re being leached from the electrode. The results of such test are set forth in Table IV.

TABLE IV

Electrode: Amount of Re in anolyte
A _____ Less than 1 p.p.m.
B _____ More than 340 p.p.m.
C _____ More than 235 p.p.m.

The foregoing definitely shows that the catalyst of the present invention is more stable than that produced by another method.

What is claimed is:

1. A platinum-rhenium anodic oxidation catalyst prepared by coreducing a solution of a platinum salt and a rhenium salt with an alkali metal borohydride.

2. A catalyst as defined by claim 1 wherein said platinum salt is sodium chloroplatinate, said rhenium salt is rhenium heptoxide and said alkali metal borohydride is sodium borohydride.

3. An electrode comprising an electroconductive metal substrate having the catalyst defined by claim 1 thereon.

4. An electrode comprising a noncarbon electroconductive metal substrate having the catalyst defined by claim 2 thereon.

References Cited by the Examiner

UNITED STATES PATENTS

| | | | |
|---|---|---|---|
| 409,365 | 8/1889 | Mond et al. | 136—86 |
| 2,267,753 | 12/1941 | Ruthardt | 252—472 |
| 2,526,657 | 10/1950 | Guyer | 252—477 |
| 2,863,762 | 12/1958 | Pullen | 75—108 X |
| 2,901,523 | 8/1959 | Justi et al. | 136—86 |
| 3,134,697 | 5/1964 | Niedrach | 136—86 |

FOREIGN PATENTS

| | | |
|---|---|---|
| 584,300 | 9/1959 | Canada. |
| 644,910 | 7/1962 | Canada. |

WINSTON A. DOUGLAS, *Primary Examiner.*

JOHN H. MACK, *Examiner.*

W. VAN SISE, A. SKAPARS, *Assistant Examiners.*